United States Patent
Ortmueller et al.

(10) Patent No.: US 10,414,259 B2
(45) Date of Patent: Sep. 17, 2019

(54) PROFILED STRIP, SYSTEM AND METHOD FOR PRODUCING A PROFILED STRIP

(71) Applicant: Elkamet Kunststofftechnik GmbH, Biedenkopf (DE)

(72) Inventors: Michael Ortmueller, Dautphetal-Herzhausen (DE); David Landeck, Marburg (DE)

(73) Assignee: ELKAMET KUNSTSTOFFTECHNIK GMBH, Biedenkopf (DE)

( * ) Notice: Subject to any disclaimer, the term of this patent is extended or adjusted under 35 U.S.C. 154(b) by 38 days.

(21) Appl. No.: 15/568,484

(22) PCT Filed: May 9, 2016

(86) PCT No.: PCT/EP2016/060281
§ 371 (c)(1),
(2) Date: Oct. 23, 2017

(87) PCT Pub. No.: WO2016/198217
PCT Pub. Date: Dec. 15, 2016

(65) Prior Publication Data
US 2018/0105026 A1    Apr. 19, 2018

(30) Foreign Application Priority Data
Jun. 9, 2015   (EP) ..................... 15171258

(51) Int. Cl.
*B60J 10/02* (2006.01)
*B60J 10/22* (2016.01)
*B60J 10/70* (2016.01)

(52) U.S. Cl.
CPC ............... *B60J 10/22* (2016.02); *B60J 10/70* (2016.02)

(58) Field of Classification Search
CPC .................................. B60J 10/22; B60J 10/70
See application file for complete search history.

(56) References Cited

U.S. PATENT DOCUMENTS 8,393,668 B2 *   3/2013   Timmermann .......... B60J 10/35
                                                                                             296/84.1
2003/0057660 A1   3/2003   Ortmueller et al.
(Continued)

FOREIGN PATENT DOCUMENTS

DE           20008555 U1   8/2000
DE      202008016217 U1   4/2009
(Continued)

*Primary Examiner* — Lori L Lyjak
(74) *Attorney, Agent, or Firm* — Leydig, Voit & Mayer, Ltd

(57) ABSTRACT

A profiled strip includes a first connecting area configured to connect to an edge area of a windshield of a motor vehicle, and a second connecting area configured to connect to a component to be adjoined to the windshield. The second connecting area has an open profile along at least one first partial section of a lengthwise extension of the profiled strip, which allows a connecting element of the adjoining component to be inserted into a receiving area delimited by the open profile. The second connecting area has a closed profile along at least one second partial section of the lengthwise extension of the profiled strip, which prevents the insertion of the connecting element into the closed profile.

15 Claims, 13 Drawing Sheets

(56) References Cited

U.S. PATENT DOCUMENTS

| | | | |
|---|---|---|---|
| 2007/0246966 A1 | 10/2007 | Polke | |
| 2011/0115261 A1* | 5/2011 | Platt | B60J 10/265 |
| | | | 296/208 |
| 2011/0285177 A1* | 11/2011 | Flammer | B60J 10/265 |
| | | | 296/208 |
| 2012/0126567 A1* | 5/2012 | Timmermann | B60J 10/30 |
| | | | 296/96.21 |
| 2014/0327267 A1 | 11/2014 | Deussen et al. | |

FOREIGN PATENT DOCUMENTS

| | | |
|---|---|---|
| DE | 202008006986 U1 | 10/2009 |
| DE | 102011056955 A1 | 6/2013 |
| DE | 102011056955 B4 | 2/2015 |
| DE | 202014106011 U1 | 3/2015 |
| EP | 2253556 A1 | 11/2010 |
| GB | 2219338 A | 12/1989 |
| WO | WO 2006002891 A2 | 1/2006 |

* cited by examiner

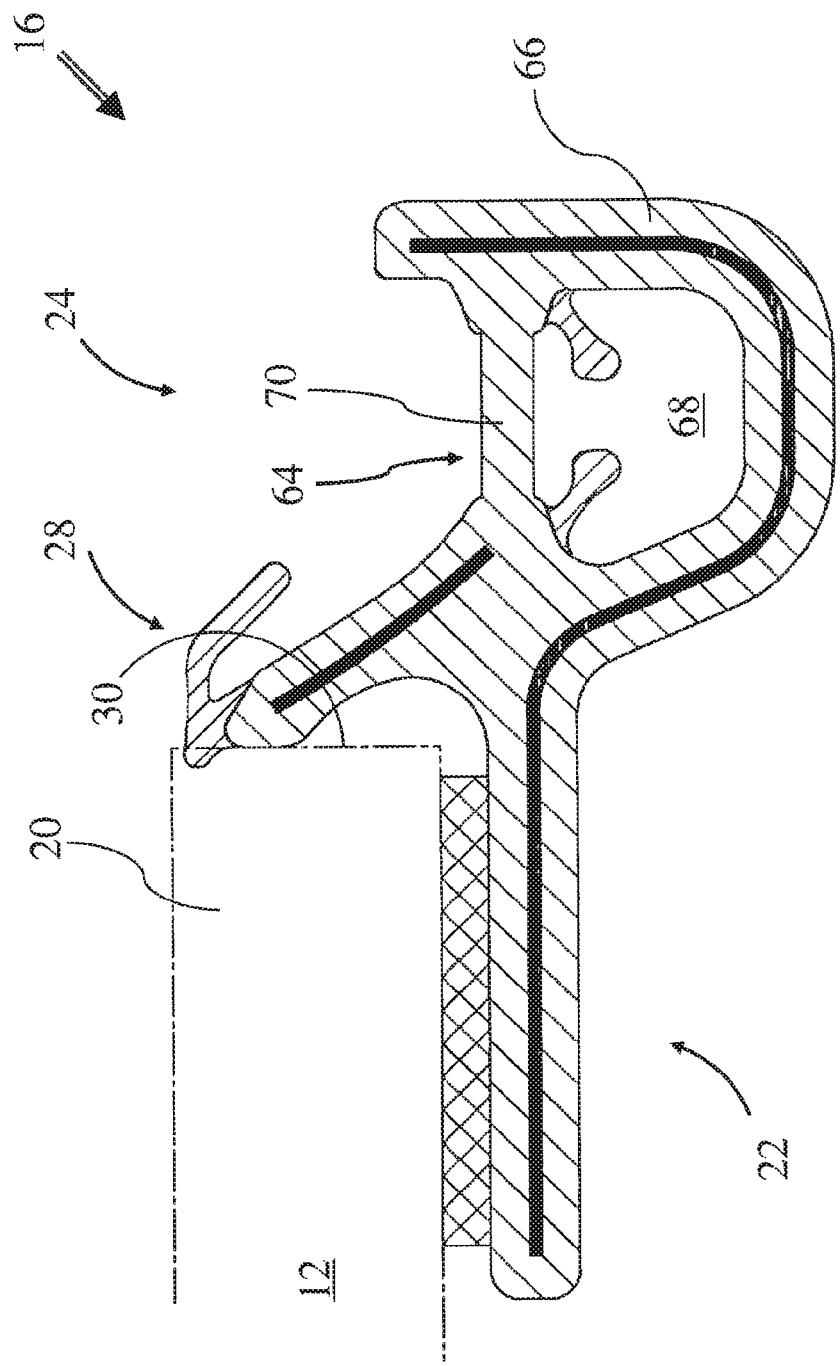

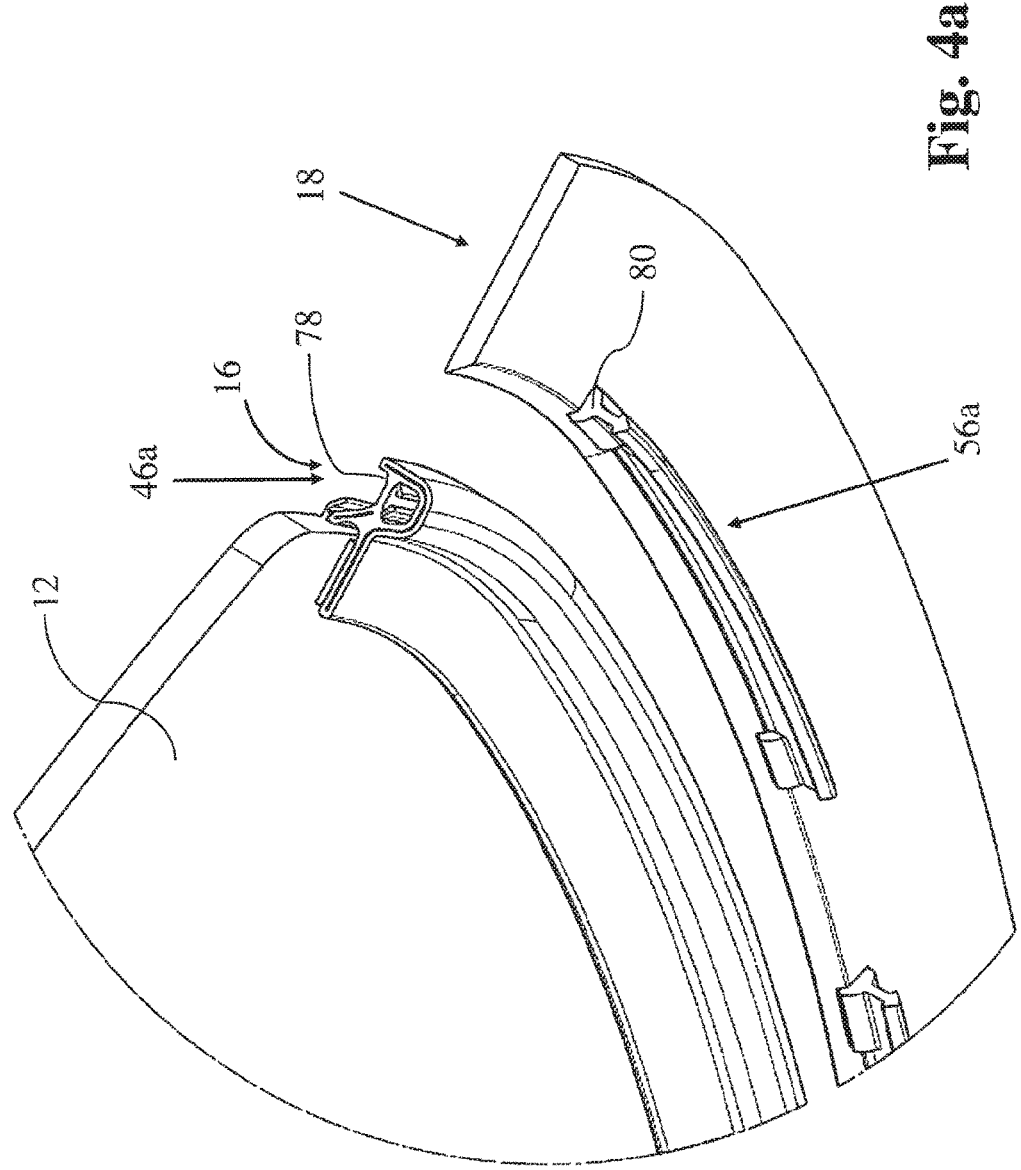

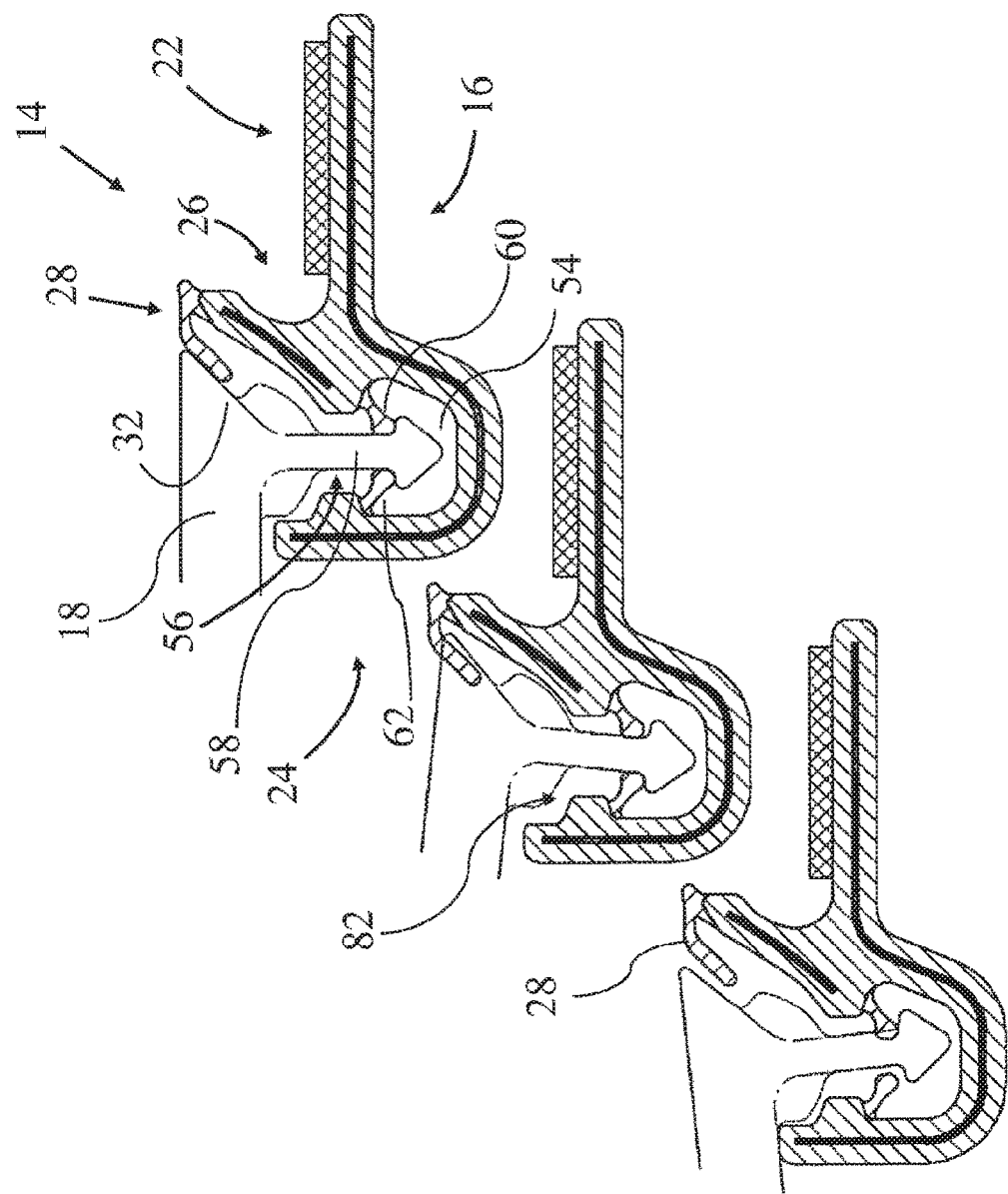

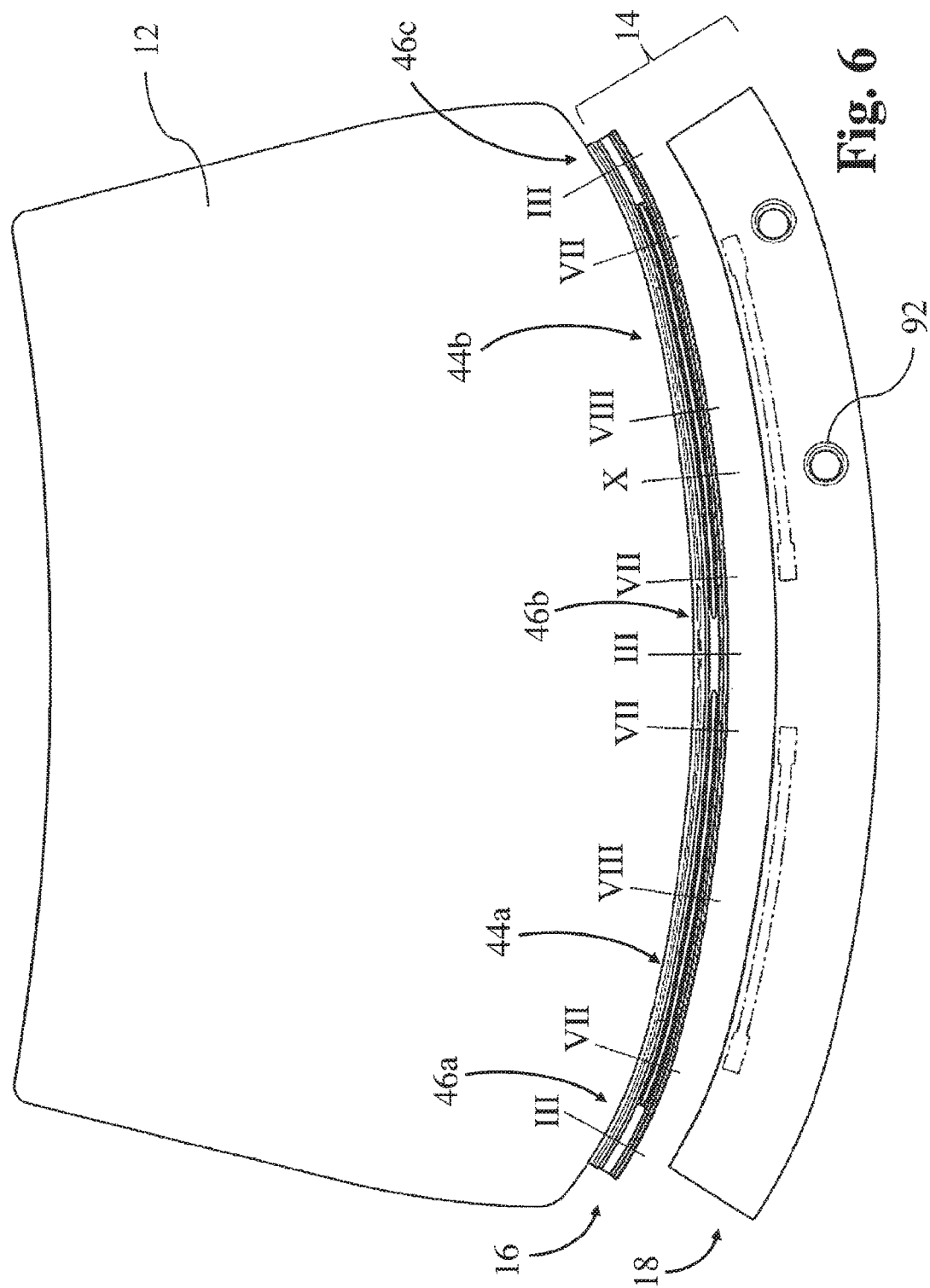

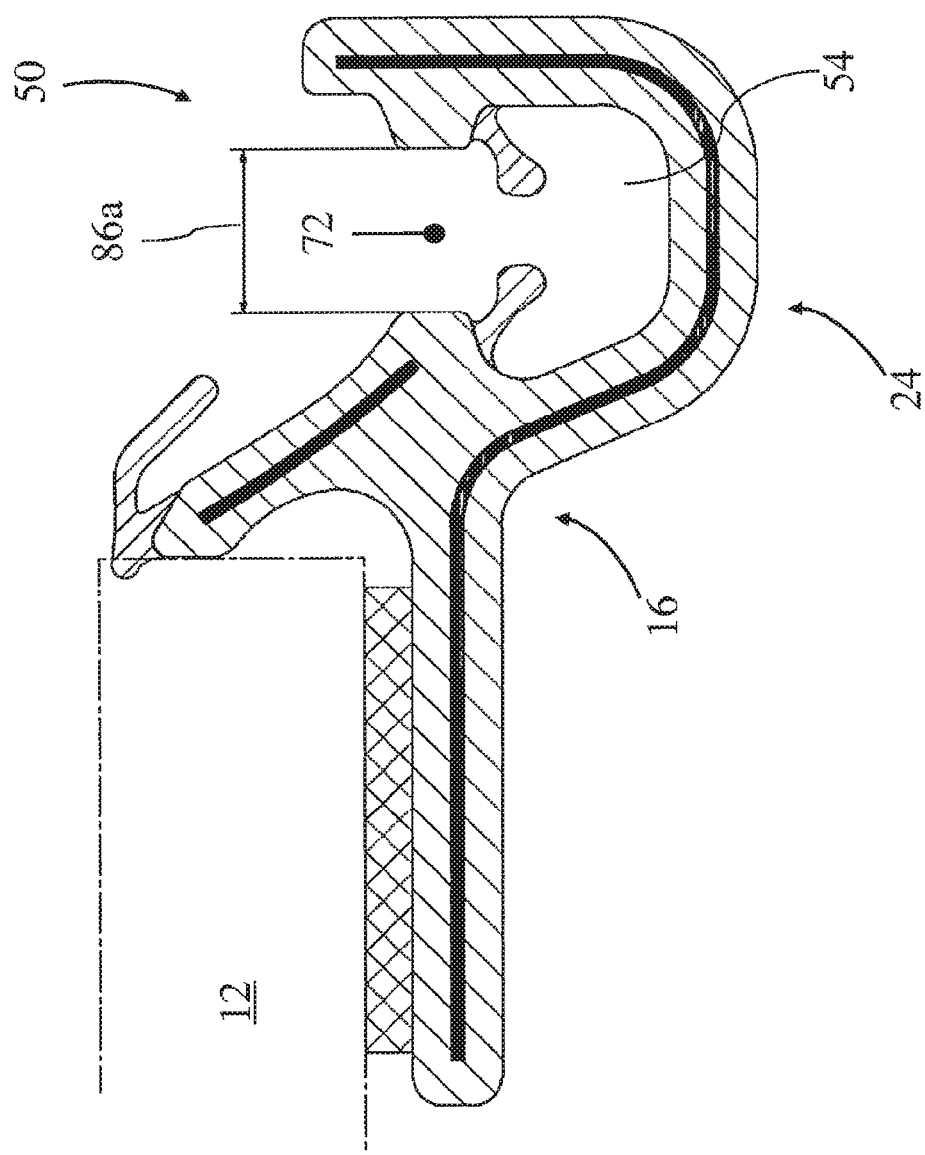

US 10,414,259 B2

PROFILED STRIP, SYSTEM AND METHOD FOR PRODUCING A PROFILED STRIP

CROSS-REFERENCE TO PRIOR APPLICATIONS

This application is a U.S. National Stage Application under 35 U.S.C. § 371 of International Application No. PCT/EP2016/060281 filed on May 9, 2016, and claims benefit to European Patent Application No. EP 15171258.5 filed on Jun. 9, 2015. The International Application was published in German on Dec. 15, 2016 as WO 2016/198217 A1 under PCT Article 21 (2).

FIELD

The invention relates to a profiled strip, having a first connecting area for connecting an edge area of the windshield of a motor vehicle, and having a second connecting area for connecting a component adjoining the windshield.

BACKGROUND

Profiled strips of the above-mentioned type are known, for example, from German utility models DE 200 08 555 U1, DE 20 2008 006 986 U1, DE 20 2008 016 217 U1 and from German patent specification DE 10 2011 056 955 B4.

For example, a profiled strip disclosed in German utility model DE 200 08 555 U1 is first connected to a vehicle window pane before the vehicle window pane with the connected profiled strip is mounted on a vehicle. Subsequently, an adjoining component in the form of a cover part is mounted which can be, for example, a water trough cover that is latched to the profiled strip. A water trough cover serves to cover a water trough that collects water running off the vehicle window pane and to drain it in a controlled manner into the engine compartment and underneath the vehicle. The water trough can be part of the car body.

The profile variants known from German utility models DE 20 2008 006 986 U1 and DE 20 2008 016 217 U1 account for a marked reduction in the installation forces required to mount the cover part, as a result of which it is possible to dispense with a support on the car body below the profiled strip.

The water trough cover is normally latched to the profiled strip over the entire profile length, that is to say, essentially over the entire width of the vehicle window pane. The edge design of modern vehicle window panes over the width of the vehicle is characterized by several radii that make a transition from one to the other, whereby, in some cases, the pane is not symmetrical relative to the vertical center plane of the vehicle. For this reason, the profiled strips are usually adapted precisely to the pane contour by means of prebending before they are installed on the edge of the pane. In order to precisely mount the water trough cover on the profiled strip so that it is as free of gaps as possible along the entire width of the pane, the water trough cover has to be aligned quite precisely relative to the profiled strip during the mounting. For this purpose, optical center markings are often placed on the profiled strip as well as on the cover, but although these markings do permit a certain orientation, they do not prevent a misalignment during the mounting.

However, in order for a profiled strip to be mounted simply and reliably, the second connecting area, which has a latching area to accommodate a latching member of the cover part, has to adhere to relatively narrow tolerances. In order to observe these narrow tolerances, even after the profile has been prebent and after the storage and transportation of the panes, which are normally done with the pane standing upright on the profiled strip, International patent application WO 2006/002891 A1 and European patent application EP 2 253 556 A1 propose inserting a transport protection profile (also often referred to as a "keder rail") into the latching area. Such transport protection profiles are provided as separate parts and they have to be removed from the latching area of the profiled strip before the cover part is mounted and then they have to be disposed of.

In order to avoid the work involved in removing and disposing of the keder rail, German patent specification DE 10 2011 056 955 B4 puts forward a profiled strip that comprises a functional element that can be moved between different functional positions. In a first functional position, the functional element closes off a latching recess and protects it against deformation and contamination; in a second functional position, the functional element opens up the latching recess so that a latching element of the water trough cover can be latched to the latching recess.

SUMMARY

In an embodiment, the present invention provides a profiled strip including a first connecting area configured to connect to an edge area of a windshield of a motor vehicle, and a second connecting area configured to connect to a component to be adjoined to the windshield. The second connecting area has an open profile along at least one first partial section of a lengthwise extension of the profiled strip, which allows a connecting element of the adjoining component to be inserted into a receiving area delimited by the open profile. The second connecting area has a closed profile along at least one second partial section of the lengthwise extension of the profiled strip, which prevents the insertion of the connecting element into the closed profile.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 3 a cross section of the profiled strip in the area of a sectional plane designated as III in FIG. 1;

FIG. 4a a perspective bottom view of an edge area of the system according to FIG. 1;

FIG. 5 a side view of the profiled strip with a comparison of three different orientations of the adjoining component when it is being fastened to the profiled strip;

FIG. 6 a top view of another embodiment of a module, comprising a profiled strip and an adjoining component;

FIG. 7 a cross section of the profiled strip in the area of a sectional plane designated as VII in FIG. 6;

DETAILED DESCRIPTION

Figure 1:
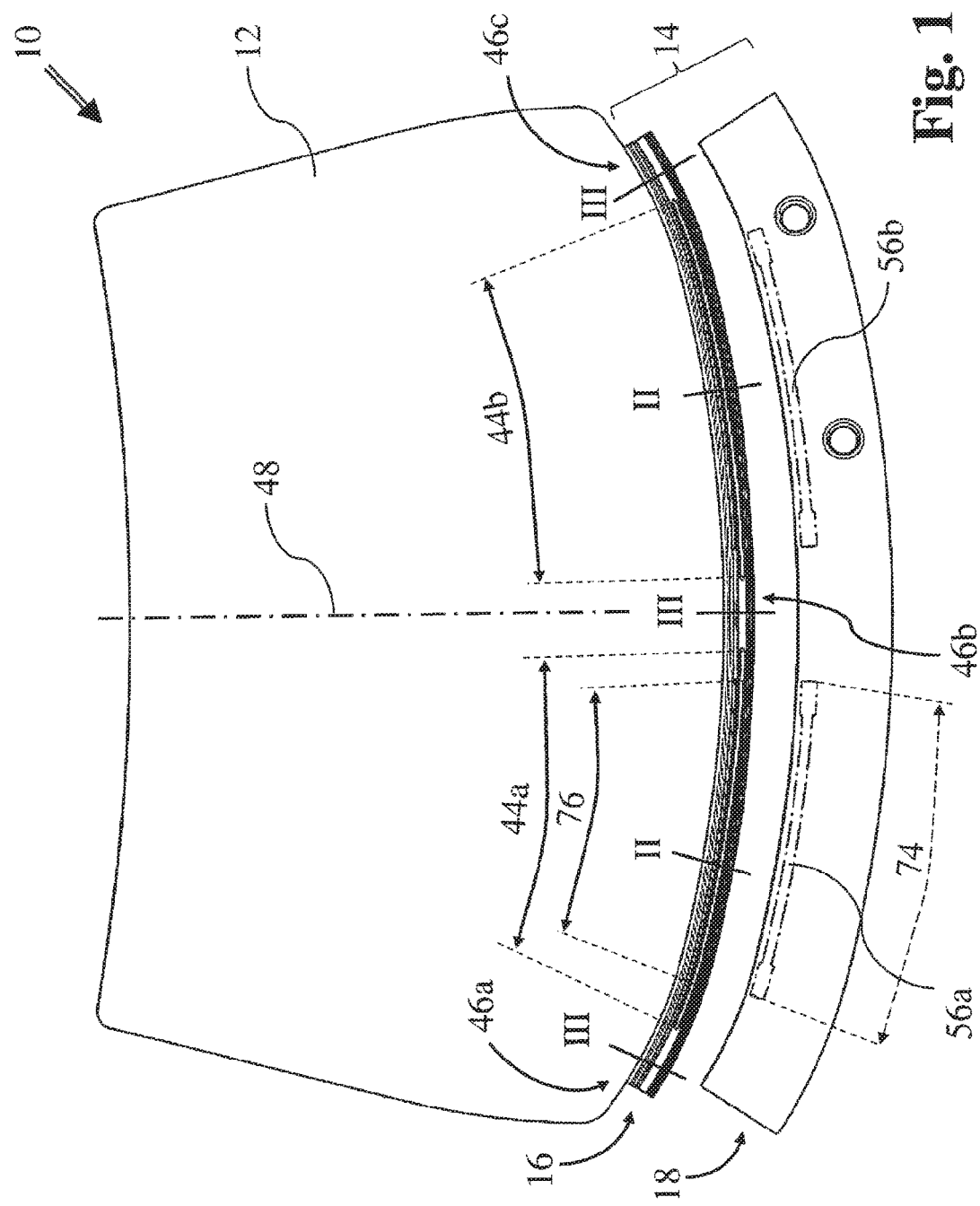
FIG. 1 a top view of an embodiment of a module with a system comprising a profiled strip and an adjoining component.

In an embodiment, the present invention provides a profiled strip that is not prone to transport damage and that permits the simplest possible mounting of the adjoining component to the profiled strip.

According to an embodiment, a profiled strip of the above-mentioned type is provided in the second connecting area with an open profile along at least one first partial section of the length of the profiled strip, said open profile allowing a connecting element of the adjoining component to be inserted into a receiving area delimited by the open profile, and also provided in the second connecting area with a closed profile along at least one second partial section of the length of the profiled strip, said closed profile preventing the insertion of the connecting element into the closed profile.

According to an embodiment the invention, the second connecting area of the profiled strip has various partial sections. At least one first partial section allows a connecting element of the adjoining component, for example, a latching element of a water trough cover, to be inserted into a receiving area that is delimited by an open profile. Unlike the first partial section, at least one second partial section of the length of the profiled strip has a closed profile so that a connecting element of the adjoining component cannot be inserted into the closed profile of the second partial section.

The closed profile of the second partial section can be a solid profile. In order to save on material, however, it is preferred for the closed profile of the second partial section to surround a hollow space.

The closed profile of the second partial section has the advantage that the profiled strip is stabilized, at least at the height of in the area of the second partial section. In this manner, deformation of and/or damage to the profiled strip can be prevented, especially during transportation.

The closed profile of the second partial section makes it possible to dispense with the arrangement of a keder rail as is known from the state of the art, which has a transport protection function and which has to be removed in order to prepare the mounting of the profiled strip and the adjoining component. According to the invention, the function of such a keder rail is replaced by the closed profile of the at least one second partial section of the profiled strip. The closed profile of the second partial section is an integral part of the profiled strip, in other words, it is not provided in the form of an additional component. In the transition area between a first partial section and a second partial section, a rim of the second partial section makes it possible to form a stop that acts in the lengthwise direction of the profiled strip so as to position a connecting element of the adjoining component. This reduces the number of degrees of freedom with which the adjoining component and the profiled strip can be joined to each other. Consequently, the precisely positioned mounting of the adjoining component can be simplified.

It is especially preferred for the partial sections to be configured in one piece with each other. In this manner, a stable and simple material bond can be created along the entire profiled strip.

If the closed profile is not a solid profile, then it is preferred for the second partial section to be formed by a groove-shaped section and by a section that closes off the groove-shaped section. Here, the section that closes off the groove-shaped section forms a crosswise web that bridges the groove-shaped section.

Preferably, the above-mentioned sections are immovable relative to each other. Thus, these sections together form a dimensionally stable bond that, within the scope of the deformability of the material used for the sections, is slightly deformable, especially elastically, but that cannot—as is known from German patent application DE 10 2011 056 955 A1—be moved into different functional positions by a relative movement of the sections. In other words, the closed profile of the second partial section cannot be opened without removing material of the second partial section in this process.

An especially preferred embodiment of the invention provides that the open profile of the first partial section has a groove-shaped section whose cross section is preferably identical to a or the groove-shaped section of the second partial section. In this manner, it is possible to match the cross sections of the first and second partial sections to each other, especially to configure them identically in terms of their groove-shaped section. This simplifies the production of the profiled strip according to the invention.

In order to avoid a local overload of the profiled strip during transportation, it is proposed for a length of a second partial section, as measured along the extension of the profiled strip, to amount to at least 0.5 cm, preferably at least 2 cm. In particular, the length of a second partial section is at least 4 cm.

In order to further improve the stability of the profiled strip, it is proposed for the second connecting area to comprise at least two second partial sections that adjoin a first partial section at opposite ends thereof. In this manner, two lateral stops can be provided for positioning a connecting element or several connecting elements of the adjoining component.

Preferably, at least one second partial section is arranged in the area of an end of the profiled strip, as seen in the lengthwise direction of the profiled strip. In this manner, an area of the profiled strip that is markedly exposed during transportation can be stabilized. After the profiled strip is mounted onto the windshield of a motor vehicle, the two ends of the profiled strip are positioned in the area of the two lower corners of the windshield.

Furthermore, it is preferred if at least one second partial section is arranged in the area of a central profile plane, as seen in the lengthwise direction of the profiled strip. In this manner, especially if a vehicle window pane to which a profiled strip is fastened is transported upright, this profiled strip can be reinforced in a main contact area.

In another preferred embodiment of the invention, it is provided that the partial sections are configured symmetrically and/or arranged symmetrically relative to a central profile plane, as seen in the lengthwise direction of the profiled strip. This permits the use of a vertical vehicle center plane as the reference plane for the mounting of the adjoining component onto the profiled strip.

In order to further simplify the mounting of the adjoining component, it is proposed for the second connecting area to have a funnel-shaped insertion section so that the adjoining component can be joined to the profiled strip at different slants. In order to further simplify the mounting, it is possible for the funnel-shaped insertion section to have material sections that are deformable in and of themselves and/or that are deformable relative to each other.

Moreover, it is possible for the first partial section to have an entrance leading to the receiving area and extending along the first partial section, whereby a width of the entrance, as measured crosswise to the extension of the profiled strip, varies along the first partial section. In this manner, it is possible to increase connecting forces, especially latching forces, that act between the profiled strip and the adjoining component by means of a local constriction of the entrance. In this context, it is preferred if the entire width of the entrance varies along the first partial section by at least 0.2 mm, preferably by at least 0.4 mm, especially preferably by 0.6 mm.

In order to further simplify the mounting, it is preferred for the second connecting area to have support elements that, when the profiled strip is in its position of use, are arranged at the bottom of the profiled strip, and that can also be referred to as buffers and that are preferably made of a soft material. The support elements can extend along the profiled strip only in sections, especially in a manner coordinated with the arrangement and positioning of car body parts, or else they can also extend along the entire profiled strip.

Moreover, it is possible for the material sections of the second connecting area, as seen in the extension direction of the profiled strip, to have varying wall thicknesses. For example, it can be advantageous to reduce wall thicknesses in the area of add-on parts such as, for instance, wiper axle bushings.

Another possibility is to vary wall thicknesses in the area of the first partial section, especially in the area of the groove-shaped section, as seen in the extension direction of the profiled strip, whereby smaller wall thicknesses account for lower connecting forces to the adjoining component and greater wall thicknesses account for an increase in the connecting forces.

If the profiled strip has a sealing area acting between the adjoining component and the edge of the vehicle window pane, it can be preferred to vary the height of this sealing area, as seen in the extension direction of the profiled strip, whereby this height is measured perpendicular to the outer shell of the vehicle. In this manner, it is possible to compensate for locally different installation heights of the profiled strip. Such varying installation heights can be found, for example, in the area of cable bushings, especially for a vehicle window pane heater.

As an alternative or in addition to this, the wall thicknesses of the first connecting area, as seen along the extension of the profiled strip, can be varied, for instance, in order to create a locally limited installation space for cable bushings.

According to another embodiment, a system is provided with a profiled strip as described above and with an adjoining component that permits the simplest possible mounting of the adjoining component onto the profiled strip.

In the system according to an embodiment of the invention, it is provided that an insertion length of a connecting element or of a group of connecting elements of the adjoining component, as measured along the extension of the profiled strip, is smaller than or equal to a receiving length of the receiving area of a first partial section, as measured along the extension of the profiled strip.

The system according to an embodiment of the invention makes it possible for the connecting element of an adjoining component to be inserted into the receiving area of a first partial section of the profiled strip and to be positioned, as seen in the extension direction of the profiled strip. Here, a side rim of the connecting element is in contact with a delimitation of the second partial section of the profiled strip. This delimitation faces in the direction of the first partial section in which the connecting element is accommodated.

If the insertion length of a connecting element or of a group of connecting elements is equal to the receiving length of the receiving area, it is possible to provide not only a stop that acts in one direction, but also a centering means that acts mutually and that permits a compulsory positioning of the adjoining component on the profiled strip, as seen in the extension direction of the profiled strip.

A preferred embodiment of the system according to the invention provides for the adjoining component to have at least two connecting elements that are separate from each other and that can be or are inserted into receiving areas of different first partial sections of the second connecting area. This permits a uniform and secure fastening of the adjoining component to the profiled strip over the extension of the profiled strip.

According to further embodiments, the present invention provides methods for the production of a profiled strip as described above.

According to a first method according to an embodiment of the invention, the profiled strip is extruded, whereby an extrusion die is used whose cross section is varied for purposes of the immediately consecutive production in one piece of the different partial sections of the second connecting area of the profiled strip.

The extrusion of the profiled strip makes it possible to produce consecutive different partial sections of the second connecting area in a continuous process. Here, the cross section of the extrusion die varies in such a way that first partial sections with an open profile and second partial sections with a closed profile are produced consecutively without an interruption of the material flow.

The extrusion process is also advantageous in terms of a local variation of the dimensions of different sections of the profiled strip, as seen along the extension of the profiled strip, as described above regarding the profiled strip according to the invention.

In another method according to an embodiment of the invention, first of all, a profile extrudate is produced whose second connecting area has a closed profile along its entire length, whereby material of the closed profile is subsequently removed, along at least one first part of the length of the profile extrudate, so that, in this first part of the length of the profile extrudate, an open profile is formed that allows a connecting element of an adjoining component to be inserted into a receiving area delimited by the open profile, and so that, in at least one second part of the length of the profile extrudate, a closed profile remains, which prevents the insertion of the connecting element into the closed profile.

The above-mentioned method has the advantage that it is not necessary to vary the cross section of the extrusion die. Within the scope of the above-mentioned method, first of all, a profile extrudate is produced whose second connecting area has a closed profile along its entire length. Starting with such a profile extrudate, material is removed along a part of the length of the profile extrudate, so that the closed profile is opened in this area and an area in the form of a first partial section as described above is formed that allows a connecting element of an adjoining component to be inserted into a receiving area delimited by the open profile.

Since only a part of the length of the profile extrudate is processed, a closed profile remains in at least one second part of the length of the profile extrudate, which corresponds to a second partial section as described above, namely, a closed profile, which prevents the insertion of the connecting element into the closed profile.

An embodiment of a module is shown in FIG. 1 and designated in its entirety by the reference numeral 10. The module 10 comprises a windshield 12 of a motor vehicle and a system 14 as described below.

The system 14 comprises a profiled strip 16 as well as an adjoining component 18 adjoining the windshield, whereby said adjoining component 18 can especially be a water trough cover.

The profiled strip 16 is connected to an edge area 20 of the windshield 12 that is at the bottom when it is in its position of use. For this purpose, the profiled strip 16 has a first connecting area 22 (see FIG. 2). For purposes of connection to the adjoining component 18, the profiled strip 16 has a second connecting area 24 (see FIGS. 2 and 5).

The connecting areas 22 and 24 are connected to each other via an intermediate area 26. The intermediate area 26 has a sealing lip 28 that extends along the profiled strip 16 and that is in contact at one end with a lower edge 30 of the windshield 12 so as to create a seal (see FIGS. 2 and 3), and it is in contact at the other end with a counter-surface 32 of the adjoining component so as to create a seal (see FIG. 5).

The areas 22, 24 and 26 of the profiled strip 16 are configured in one piece with each other and produced especially by means of extrusion. The sealing lip 28 is preferably made of a softer material than the areas 22, 24 and 26, for example, of a thermoplastic elastomer (TPE). In particular, the sealing lip is produced by means of co-extrusion, together with the areas 22, 24 and 26.

Preferably, the areas 22, 24 and 26 are made of a plastic material such as, for example, poly(vinylchloride) (PVC), of a blend of poly(vinylchloride) and poly(acrylonitrile-butadiene-styrene) (PVC/ABS) or of poly(propylene) (PP).

In order to further increase the stability of the profiled strip 16, it is preferred for reinforcement elements, especially made of metal, to be provided, which are embedded into at least one of the areas 22, 24 and 26. For example, a first reinforcement element 34 is provided which, starting from the first connecting area 22, extends over the intermediate area 26 all the way to the second connecting area 24. Moreover, for example, a second reinforcement element 36 is provided which exclusively reinforces the intermediate section 26.

The first connecting area 22 comprises a web-shaped section 38 that extends parallel to the bottom 40 of the windshield 12. An adhesive layer 42 is provided to join the section 38 to the windshield 12.

The second connecting area 24 has different partial sections, as seen along the length of the profiled strip 16. Here, first partial sections are designated by the reference numerals 44a and 44b in FIG. 1; second partial sections that differ from these are designated by the reference numerals 46a, 46b, 46c.

The first partial sections 44a, 44b differ from the second partial sections 46a, 46b, 46c in that the second connecting area 24 has different cross sections in the area of the different partial sections. In the area of the first partial sections 44a, 44b, the profiled strip 16 has a cross section as shown in FIG. 2; in the area of the second partial sections 46a, 46b, 46c, the profiled strip 16 has a cross section as shown in FIG. 3.

All of the cited partial sections 44a to 46c are symmetrical relative to a central profile plane 48. This means that the first partial sections 44a and 44b as well as the partial sections 46a and 46c are each of identical length and are each at the same distance from the central profile plane 48.

Figure 2:
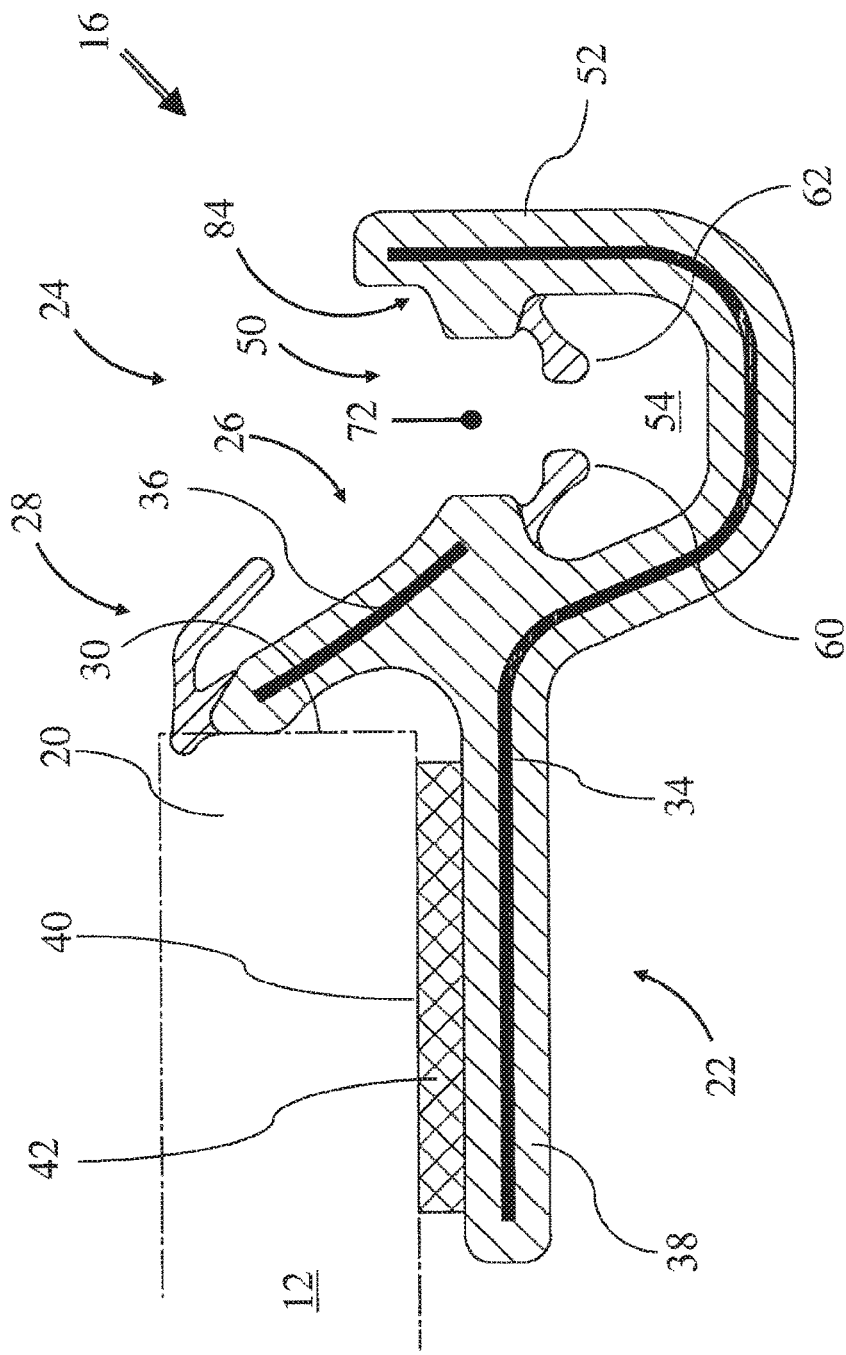
FIG. 2 a cross section of the profiled strip in the area of a sectional plane designated as II in FIG. 1.

In the area of a first partial section 44a, 44b, the second partial section 24 has an open profile 50 (see FIG. 2). The open profile 50 is formed by a groove-shaped section 52 that has a U-shaped cross section or that is shaped approximately like the letters "U" or "V". The groove-shaped section 52 delimits a receiving area 54 into which a connecting element 56, especially in the form of a latching element 58, can be inserted (see FIG. 5).

For purposes of latching with a latching element 58, the second connecting area 24 has at least one, preferably two latching lips 60, 62 that are arranged opposite from each other. It is possible for the at least one latching lip 60, 62 to be made of a softer material than the areas 22, 24, 26 of the profiled strip 16. The at least one latching lip 60 is preferably produced as an integral part of the profiled strip 16 by means of co-extrusion.

In the area of a second partial section 46a, 46b, 46c, in contrast to the open profile 50 of the first partial sections 44a, 44b, the second connecting area 24 has a closed profile 64 (see FIG. 3).

Diverging from the illustrative drawing, the closed profile 64 can be configured to be completely solid. Preferably, however, the closed profile 64 is a hollow profile that surrounds a hollow space 68. The hollow space 68 is formed by the groove-shaped section 66 and by a section 70 that closes off the groove-shaped section 66. The section 70 forms a crosswise web that, in contrast to an open entrance 72 (see FIG. 2), prevents the insertion of a connecting element 56 of the adjoining component into the closed profile 64.

Preferably, the adjoining component 18 has a plurality of connecting elements 56, for example, two connecting elements 56a, 56b (see FIG. 1). The connecting elements 56a, 56b extend parallel to the profiled strip 16. The connecting elements 56a, 56b have a length that will be referred to below as the insertion length 74. The insertion length 74 is smaller than or equal to a receiving length 76 of a first partial section 44a, 44b.

The receiving length 76 of a first partial section 44a, 44b can be equal to the length of a first partial section 44a, 44b or smaller than the length of a first partial section 44a, 44b. The latter can be achieved, for instance, in that, only in the area of the receiving length 76, the entrance 72 is wide enough to permit the passage of a connecting element 56. If the cross section between a first partial section 44a and an adjoining second partial section 46a, 46b is changed practically without a transition, then the receiving length 76 is equal to the length of the first partial section 44a.

Figure 4B:
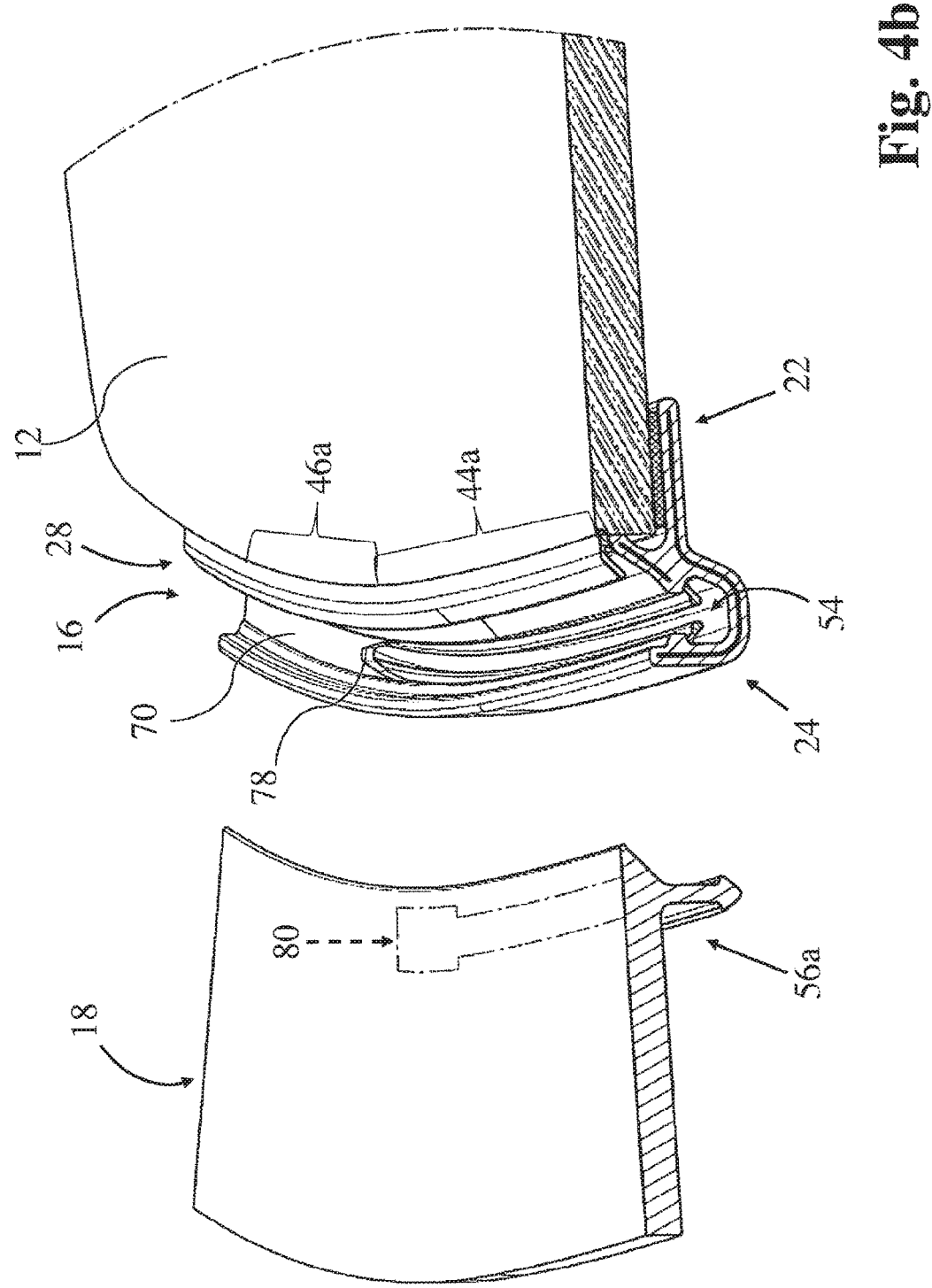
FIG. 4b a perspective top view of the edge area of the system according to FIG. 1.
Figure 8:
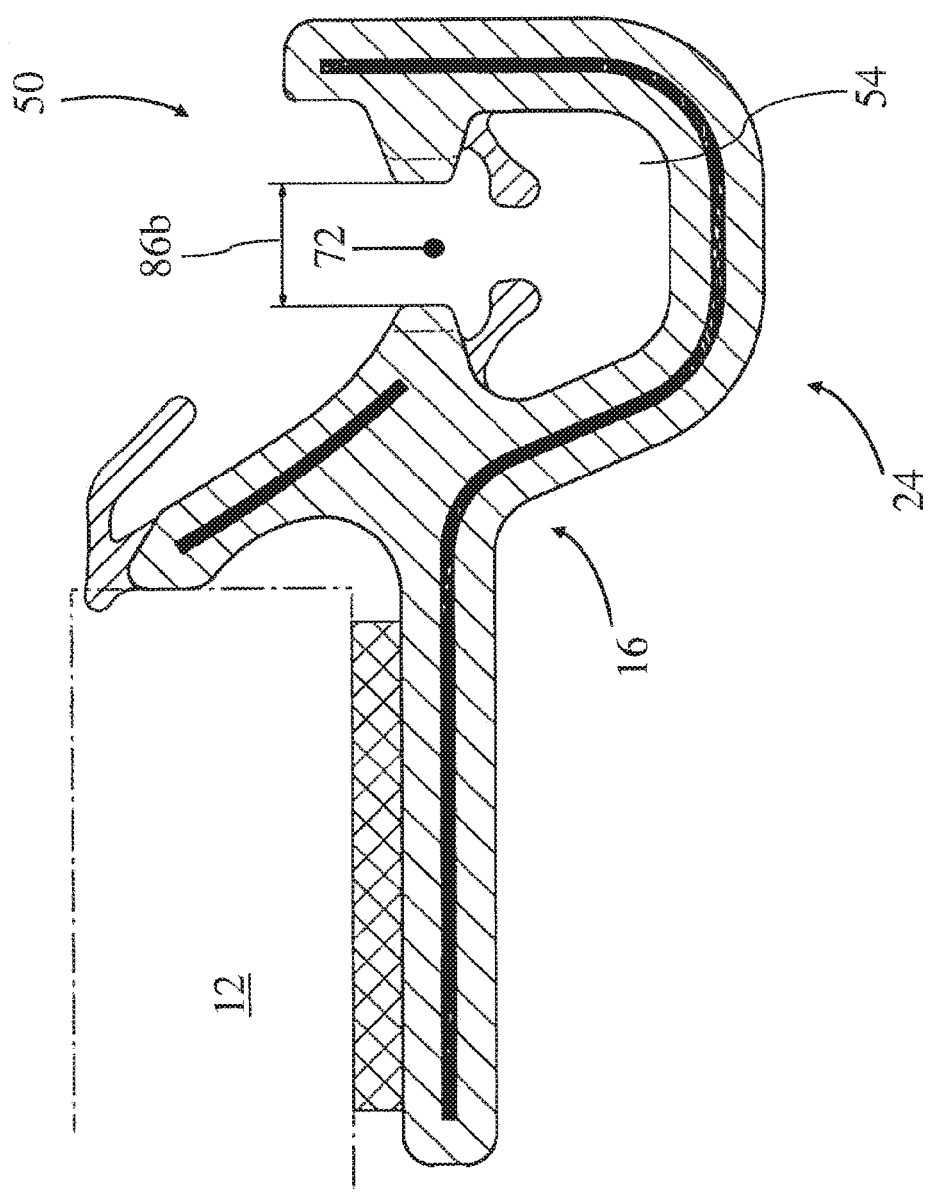
FIG. 8 a cross section of the profiled strip in the area of a sectional plane designated as VIII in FIG. 6.
Figure 9:
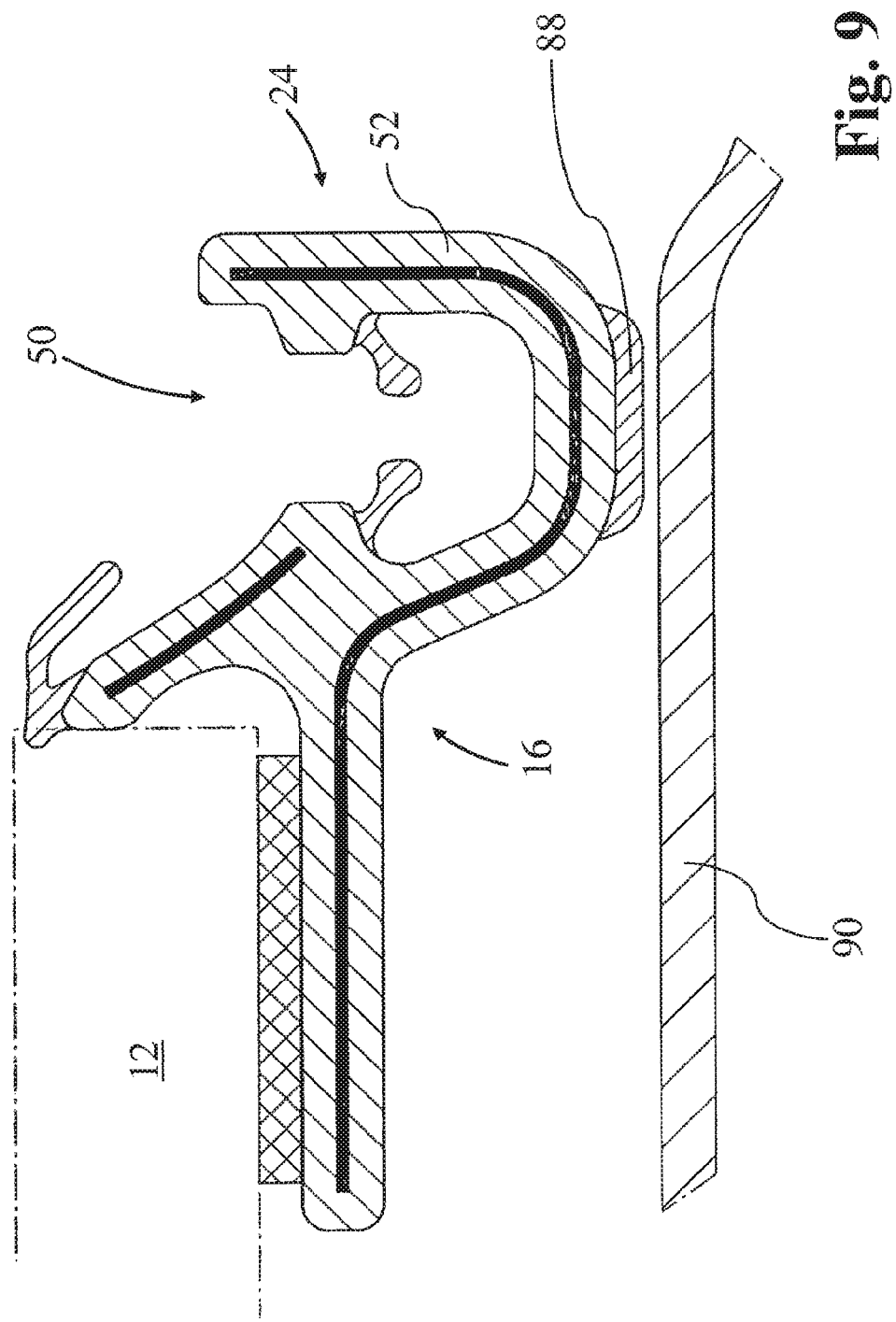
FIG. 9 a cross section of another embodiment of a profiled strip.
Figure 10:
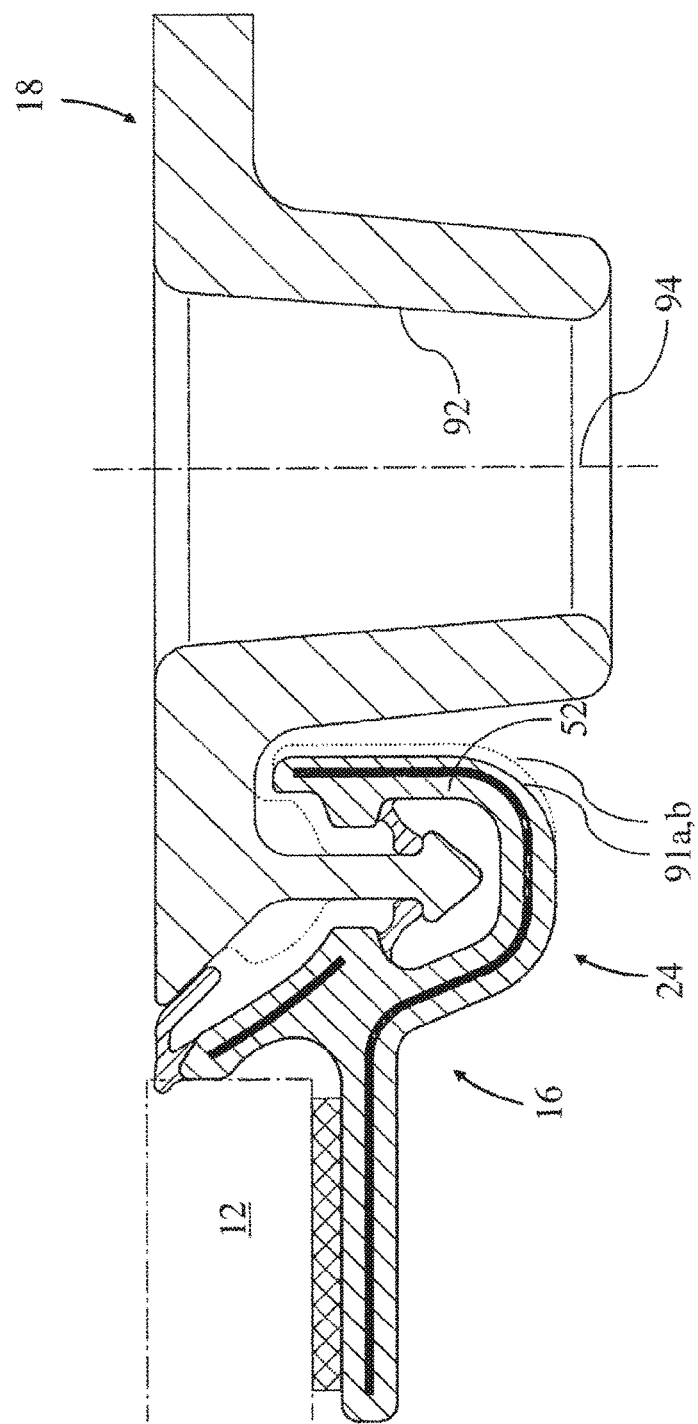
FIG. 10 a cross section of another embodiment of a profiled strip.

The delimitations 78 of a second partial section 46a, 46b, 46c adjoining a first partial section 44a, 44b, said delimitations 78 facing a first partial section 44a, 44b, can be used as a contact site for a lateral delimitation surface 80 of a connecting element 56 (see FIGS. 4a and 4b). This facilitates the positioning of the adjoining component 18 in the lengthwise direction of the profiled strip 16.

In order to facilitate the insertion of the connecting elements 56 of the adjoining component 18 into the receiving area 54, it is preferred if the profiled strip 16 has a funnel-shaped insertion area 82. The section 82 is formed by a surface of the intermediate area 26 facing the outside of the vehicle as well as by a free end area 84 of the groove-shaped section 52 (see FIG. 2). Thanks to the funnel-shaped section 82, the adjoining component 18 can be oriented at different slants during the mounting onto the profiled strip 16, for example, at an angle that is excessively steep (see FIG. 5, middle) or at an angle that is excessively flat (see FIG. 5, left). Thus, the cover part does not have to be precisely aligned already during the mounting (see FIG. 5, upper right).

Further advantageous embodiments are described below with reference to FIGS. 6 to 12.

It is possible for the width of the entrance 72 of the open profile 50 of a first partial section 44a to vary along the course of a first partial section 44a, 44b. For example, the width 86a of an entrance 72 in the area of an end area of first partial section 44a, 44b can be larger (see FIG. 7) than in a center area whose entrance 72 has a width 86b that is smaller (see FIG. 8). The latching force with which a latching element 58 is connected to the second connecting area 54 can be locally varied by varying the width 86a, 86b of an entrance 72. In addition or as an alternative to this, the variation of the width 86a, 86b can also be used to influence the receiving length 76 of a first partial section 44a, 44b.

Below, additional possibilities will be described for varying the cross section geometry of a profiled strip 16 as seen along its length:

For example, on the bottom of the groove-shaped section 52 of the second connecting area 24, a buffer section 88 can be provided that serves to be able to support the second connecting area on a car body part 90.

Moreover, the wall thickness of a groove-shaped section 52 of the second connecting area 24 can be varied. For example, it can be advantageous to locally thin out a side wall of the groove-shaped section 52, as is shown by the outer contours 91a, 91b in FIG. 10. This thinning out serves to create installation space for the bushing 92 of a wiper axle 94 provided on the adjoining component 18 (see FIGS. 6 and 10).

Figure 11:
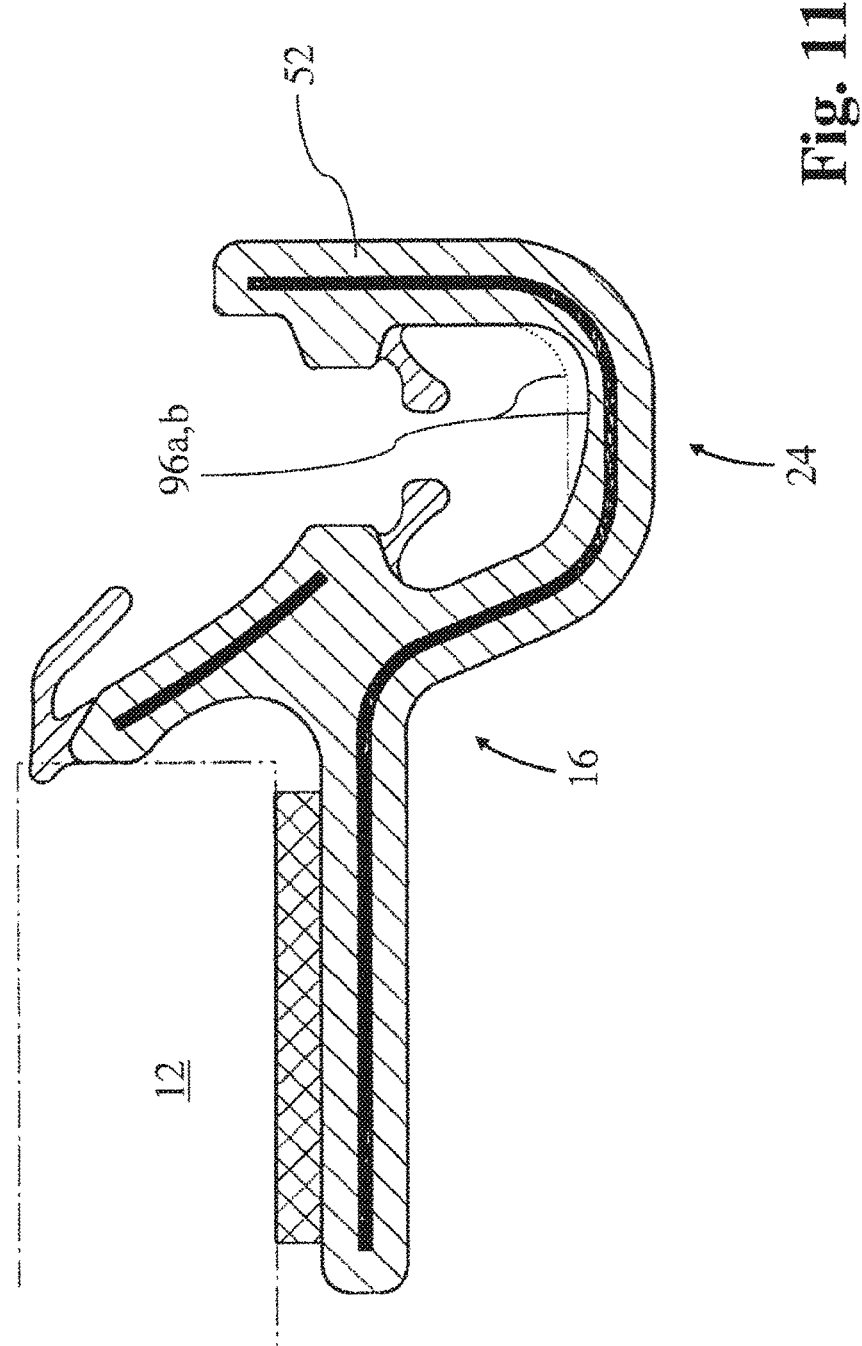
FIG. 11 a cross section of another embodiment of a profiled strip.

Correspondingly, a bottom section of the groove-shaped section 52, as seen along the length of the profiled strip 16, can be provided with different wall thicknesses, as is indicated in FIG. 11 by the reference numerals 96a and 96b.

Figure 12:
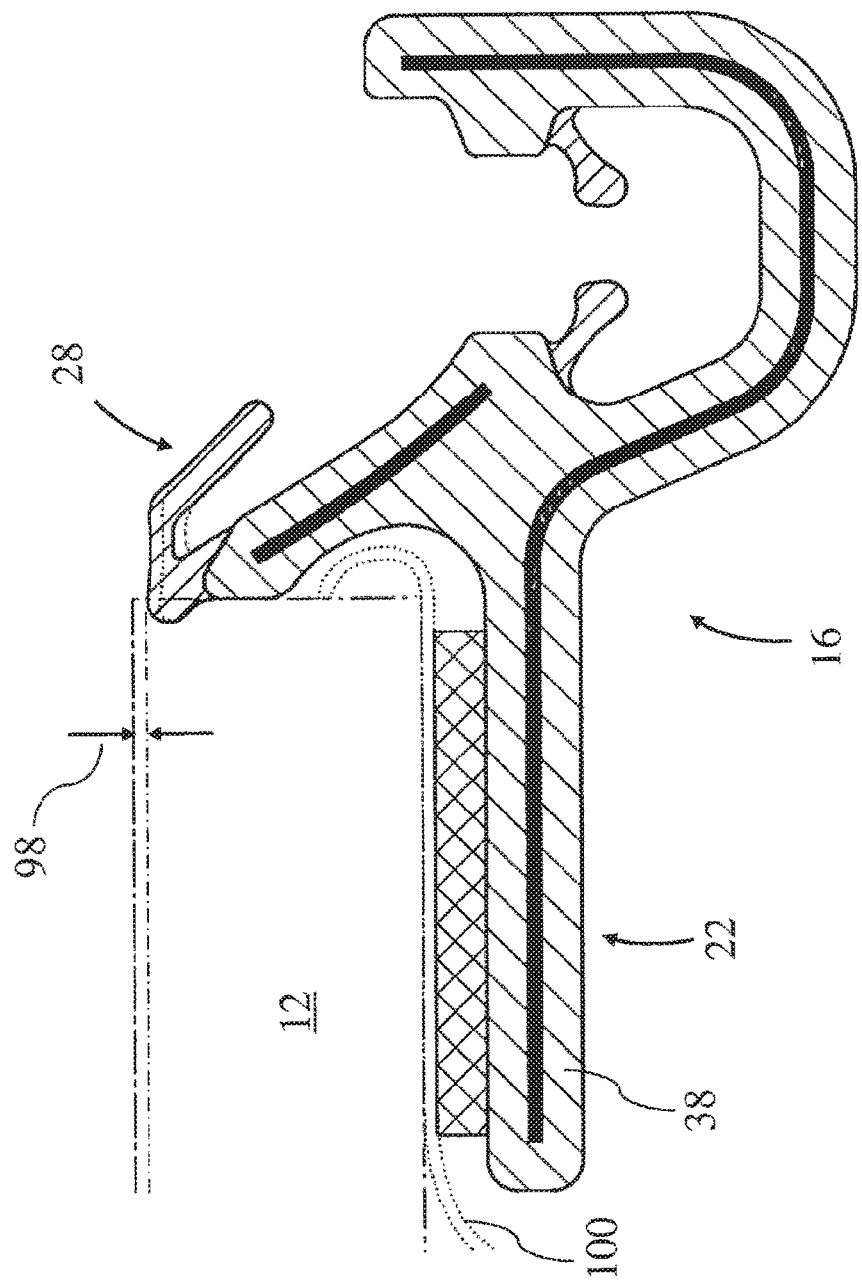
FIG. 12 a cross section of another embodiment of a profiled strip.

It is also possible to vary the installation height of the sealing lip 28, for example, by a dimension 98 that corresponds to the height dimension of a cable 100 (see FIG. 12). Correspondingly, the wall thickness of the web-shaped section 38 of the 1 connecting area 22 can be varied.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A profiled strip, comprising:
a first connecting area configured to connect to an edge area of a windshield of a motor vehicle; and
a second connecting area configured to connect to a component to be adjoined to the windshield,
wherein the second connecting area has an open profile along at least one first partial section of a lengthwise extension of the profiled strip, the open profile allowing a connecting element of the adjoining component to be inserted into a receiving area delimited by the open profile, and
wherein the second connecting area has a closed profile along at least one second partial section of the lengthwise extension of the profiled strip, the closed profile preventing the insertion of the connecting element into the closed profile.

2. The profiled strip according to claim 1, wherein the partial sections of the lengthwise extension of the profiled strip are configured in one piece with each other.

3. The profiled strip according to claim 1, wherein the closed profile is formed by a groove-shaped first section and by a second section that closes off the first section.

4. The profiled strip according to claim 3, wherein the first and second sections of the closed profile are immovable relative to each other.

5. The profiled strip according to claim 3, wherein the open profile has a groove-shaped section with a same cross section as the first section of the closed profile.

6. The profiled strip according to claim 1, wherein a length of the second partial section measured along the lengthwise extension of the profiled strip amounts to at least 0.5 cm.

7. The profiled strip according to claim 1, wherein the second connecting area comprises at least two second partial sections that adjoin a first partial section at opposite ends thereof.

8. The profiled strip according to claim 1, wherein the at least one second partial section is arranged in an area of an end of the lengthwise extension of the profiled strip.

9. The profiled strip according to claim 1, wherein the at least one second partial section is arranged in an area of a central profile plane of the lengthwise extension of the profiled strip.

10. The profiled strip according to claim 1, wherein the partial sections are configured symmetrically and/or arranged symmetrically relative to a central plane of the lengthwise extension of the profiled strip.

11. A system, comprising:
a component having at least one connecting element; and
a profiled strip comprising:
a first connecting area configured to connect to an edge area of a windshield of a motor vehicle; and
a second connecting area adjoined to the component,
wherein the second connecting area has an open profile along at least one first partial section of a lengthwise extension of the profiled strip, the open profile allowing a connecting element of the adjoining component to be inserted into a receiving area delimited by the open profile, and wherein the second connecting area has a closed profile along at least one second partial section of the lengthwise extension of the profiled strip, the closed profile preventing the insertion of the connecting element into the closed profile, wherein an insertion length of the at least one connecting element of the adjoining component, as measured along the lengthwise extension of the profiled strip is smaller than or equal to a receiving length of a receiving area of the at least one first partial section, as measured along the lengthwise extension of the profiled strip.

12. The system according to claim 11, wherein a delimitation of the at least one second partial section adjoins the at least one first partial section, the delimitation facing the at least one first partial section and forming a contact surface configured to contact a lateral delimitation surface of the at least one connecting element.

13. The system according to claim 11, wherein the component has at least two connecting elements that are separate from each other and that are insertable into receiving areas of different first partial sections of the second connecting area.

14. A method for producing a profiled strip according to claim 1, the method comprising extruding the profiled strip using an extrusion die having a cross section that is varied so as to provide immediately consecutive production in one piece of the different partial sections of the second connecting area of the profiled strip.

15. The method for the production of a profiled strip according to claim 1, the method comprising:
   firstly producing a profile extrudate having the second connecting area with the closed profile along an entire length of the profile extrudate and subsequently
   removing material of the closed profile along at least one first part of the length of the profile extrudate, so that, in the first part of the length of the profile extrudate, the open profile is formed that allows a connecting element of the component to be inserted into a receiving area delimited by the open profile, and so that, in at least one second part of the length of the profile extrudate the closed profile remains, which prevents the insertion of the connecting element into the closed profile.

* * * * *